US 8,700,065 B2

(12) United States Patent
Choi-Grogan

(10) Patent No.: US 8,700,065 B2
(45) Date of Patent: Apr. 15, 2014

(54) LOCATION DETERMINATION FOR CALLS WITHIN A FEMTOCELL

(71) Applicant: AT&T Mobility II LLC, Atlanta, GA (US)

(72) Inventor: Yung Shirley Choi-Grogan, Issaquah, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

(21) Appl. No.: 13/911,048

(22) Filed: Jun. 5, 2013

(65) Prior Publication Data

US 2013/0337846 A1 Dec. 19, 2013

Related U.S. Application Data

(63) Continuation of application No. 12/552,838, filed on Sep. 2, 2009, now Pat. No. 8,483,713.

(51) Int. Cl.
*H04W 24/00* (2009.01)

(52) U.S. Cl.
USPC .............. 455/456.2; 455/456.1; 455/422.1; 455/435.1; 455/404.1; 455/404.2

(58) Field of Classification Search
USPC ............. 455/422.1, 404.1, 404.2, 435.1, 455/456.1–456.6
See application file for complete search history.

(56) References Cited

U.S. PATENT DOCUMENTS

| | | |
|---|---|---|
| 2007/0238448 A1 | 10/2007 | Gallaghar et al. |
| 2008/0299992 A1 | 12/2008 | Eitan et al. |
| 2009/0156213 A1 | 6/2009 | Spinelli et al. |
| 2009/0311987 A1 | 12/2009 | Edge et al. |
| 2010/0120394 A1 | 5/2010 | Mia et al. |
| 2010/0120447 A1 | 5/2010 | Anderson et al. |
| 2010/0167732 A1 | 7/2010 | Vakil et al. |
| 2010/0197309 A1 | 8/2010 | Fang et al. |
| 2010/0241496 A1 | 9/2010 | Gupta et al. |
| 2011/0009097 A1 | 1/2011 | Sweeney et al. |
| 2011/0013528 A1 | 1/2011 | Chen et al. |
| 2011/0165878 A1* | 7/2011 | Nylander et al. ............ 455/436 |
| 2012/0044908 A1 | 2/2012 | Spinelli et al. |
| 2012/0129567 A1* | 5/2012 | Kimura et al. ............... 455/522 |
| 2013/0059576 A1* | 3/2013 | Park et al. .................. 455/422.1 |
| 2013/0288678 A1* | 10/2013 | Lott et al. .................. 455/435.1 |

OTHER PUBLICATIONS

Office Action dated Oct. 7, 2011 for U.S. Appl. No. 12/552,838, 7 pages.
Office Action dated Apr. 24, 2012 for U.S. Appl. No. 12/552,838, 11 pages.

* cited by examiner

*Primary Examiner* — Ajit Patel
(74) *Attorney, Agent, or Firm* — Amin, Turocy & Watson, LLP

(57) ABSTRACT

When a call is placed within a femtocell area of coverage, the location of the femtocell is used as the location of the mobile device. The location of the femtocell is stored in the network, and if the call is placed through the femtocell, the location of the femtocell is used to determine the location of the mobile device.

20 Claims, 5 Drawing Sheets

LOCATION DETERMINATION FOR CALLS WITHIN A FEMTOCELL

CROSS-REFERENCE TO RELATED APPLICATION

The subject application is a continuation of U.S. application Ser. No. 12/552,838, filed Sep. 2, 2009, and entitled "LOCATION DETERMINATION FOR CALLS WITHIN A FEMTOCELL", the disclosure of which is incorporated herein by reference in its entirety.

TECHNICAL FIELD

The technical field generally relates to wireless communications and more specifically relates to wireless communication in an emergency situation via femtocells.

BACKGROUND

Communications devices such as cellular telephones, mobile communication devices, personal digital assistants (PDAs), laptops, and the like are becoming more prevalent as users appreciate the smaller form factors, increased functionality, and the mobility of the devices. It is not uncommon for a household to give up its land lines and use mobile devices exclusively. To that end, femtocells have been growing in popularity. Use of a femtocell can prevent dead zones with its area of coverage. A femtocell can be thought of as a small wireless base station having a limited area of coverage. Femtocells are typically designed for residential or small business use. Commonly, a femtocell acts as a connection to an Internet and as a wireless router to various wireless devices. Calls are connected to the devices via an approved wireless interface and the call is backhauled (communicated to a communications network) via the Internet.

With this increase in availability of cellular coverage comes problems associated with the use of mobile devices in this fashion. Suites of location-based services have been developed around the premise that service providers are able to identify the location of mobile devices attached to their networks and provide additional services based on that location. More specifically is the requirement by the Federal Communications Commission ("FCC") that emergency 911 (E911) calls made from mobile devices must provide caller location accuracy to be within 50 meters for 67% of the calls and within 100 meters for 100% of the calls. For devices that do not have GPS, the accuracy will typically be lower than for those devices that have embedded GPS capability. In order to meet the FCC requirements, the use of femtocells may be further exploited in order to raise the overall location accuracy, even for legacy mobile devices that may not have GPS capability embedded therein.

SUMMARY

The present invention includes a method for reporting a location of a call via a femtocell, which includes the steps of registering the location of the femtocell, processing a call originating from a mobile device within the coverage area of the femtocell, determining the location of the femtocell serving the mobile device and reporting the location of the femtocell. The method may further include determining the location of the mobile device and comparing the location of the mobile device with the location of the femtocell, and if the compared difference between the location of the mobile device and the location of the femtocell exceeds a threshold, then reporting the location of the mobile device. The invention may also include determining a more specific location within a femtocell and wherein the reporting step includes reporting the more specific location. The invention includes a system for practicing the method, and includes a system for reporting location of a mobile device, that includes a cellular network, a femtocell in communication with the cellular network, wherein the location of the fermtocell is stored in the network, and a server configured to query whether a femtocell is serving the mobile device, and based on the query, if the femtocell is serving the mobile device, reporting the location as the stored location of the femtocell, and if the femtocell is not serving the mobile device, determining the location of the mobile device and reporting the determined location. the system may also include the femtocell determining a more specific location, and if the query indicates that the femtocell is serving the mobile device, then reporting the more specific location.

BRIEF DESCRIPTION OF THE DRAWINGS

The following description is better understood when read in conjunction with the appended drawings.

DETAILED DESCRIPTION OF ILLUSTRATIVE EMBODIMENTS

Femto cell coverage is small and unqiue to each household or enterprise. As more femto cells are deployed in the network, it is possible to take advantage of the smaller femtocell coverage and unique address to locate E911 calls. This provides access point and cell coverage for an unique address and subscriber group. When a femto cell is installed, the subscriber location information will be provisioned in addition to the network cell information.

For E911 calls that are made within a femtocell, instead of using the estimated location, which will have some level of inaccuracy, the subscriber address can be retrieved from the site profile when an E911 call is detected and thereby enabling the network to then use the femtocell installation information and customer subscription to provide the exact address to a public safety access point ("PSAP"). In an example embodiment, a caller gaining access to the cellular network by means of a femtocell is located by the network based on the location of the femtocell. This helps alleviates the processing delay and the potential for error when determining the location of the caller for emergency response purposes. However, using this technique, other location-based services could be provided as well. In various example embodiments, back-up location processing could be performed to verify the location of the femtocell, or to be provided in the case that there is an error in the recordation or the reporting of the location femtocell. Such back-up location processing could be performed by any known methodology, including assisted global positioning systems (AGPS), time delay of arrival (TDOA), round trip timing delay, triangulation, and any other method used to calculate the location of a mobile device.

Figure 1:
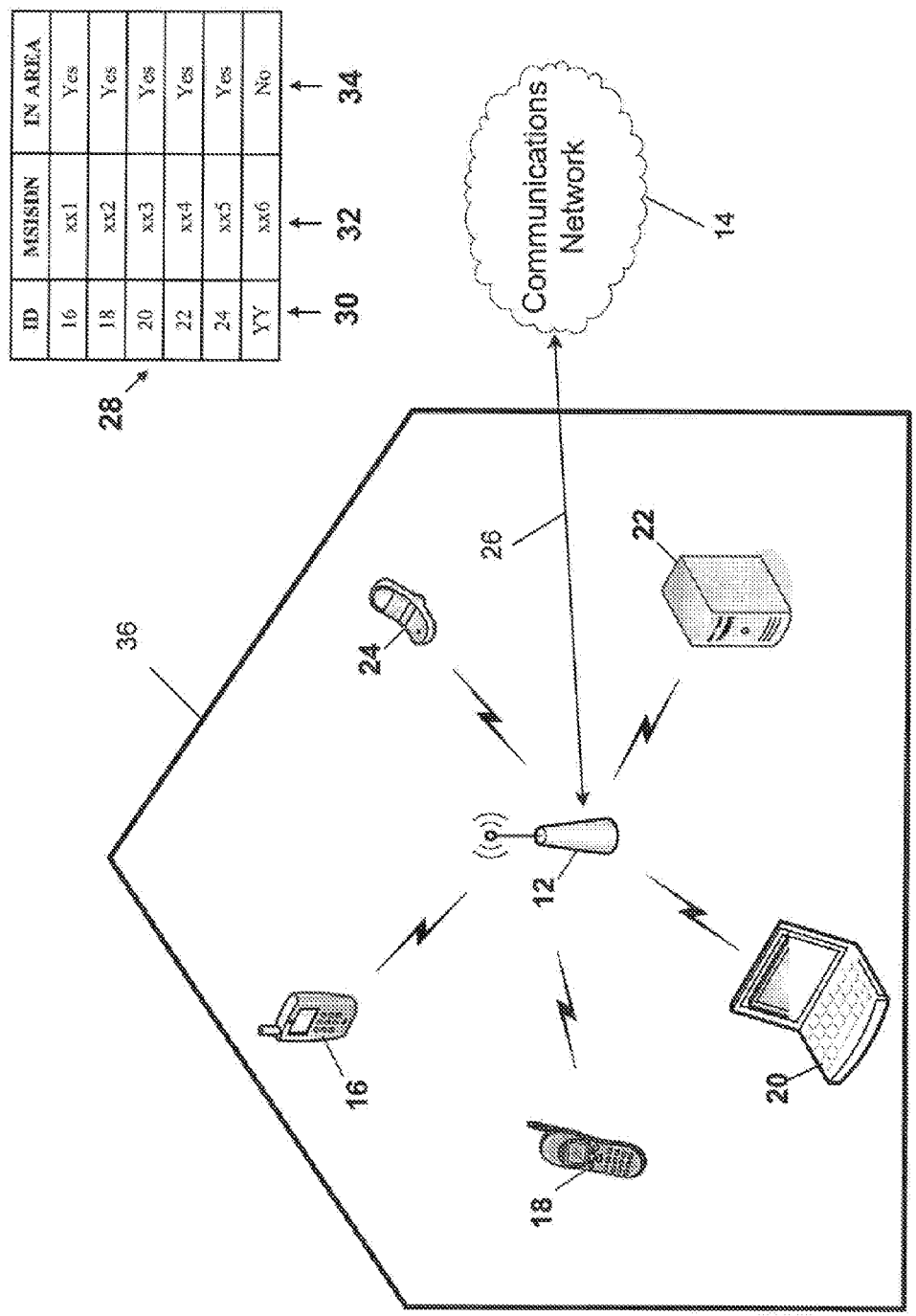
FIG. 1 is an illustration of an example femtocell in communications with a communications network and example communications devices.

FIG. 1 is an illustration of an example femtocell 12 in communications with a communications network 14 and example communications devices 16, 18, 20, 22, and 24. The femtocell 12 can comprise any appropriate femtocell. In an example configuration, the femtocell 12 is a portable device that can be deployed in various locations. The femtocell 12 communicates with the devices 16, 18, 20, 22, 24, via a wireless interface. Any appropriate wireless interface can be utilized for communications between the femtocell 12 and the devices 16, 18, 20, 22, 24. For example, the wireless link can be in accordance with the following protocols: GSM, CDMA, WIMAX, WIFI, ZIGBEE, or a combination thereof. Example power output of the femtocell 12 can be from 0.5 to 0.1 Watts. The coverage area and range of a femtocell may vary, but in general the range is less than 500 feet. The femtocell 12 is coupled to the communications network 14 via interface 26. The interface 26 can comprise any appropriate interface, such as, for example, an IP packet data interface (e.g., the Internet).

Communications devices 16, 18, 20, 22, 24, represent any appropriate type and number of communications devices configured to communicate with the femtocell 12. A communications device may comprise a mobile device or a stationary device. A communications device, may include, for example, a portable media player, a portable music player, such as an MP3 player, a walkman, a portable computing device, such as a laptop, a personal digital assistant ("PDA"), a portable phone, such as a cell phone or the like, a smart phone, a Session Initiation Protocol (SIP) phone, a video phone, a portable email device, a portable gaming device, a consumer electronic device, such as a TV, a DVD player, a set top box, a navigation device and/or a non-conventional computing device, such as a kitchen appliance, or a combination thereof.

As communications devices enter and exit the area of coverage (depicted by the building outline 36) of the femtocell 12, the femtocell 12 may maintain information about the communications devices, as depicted in example table 28. When a communications device enters the area of coverage 36 of the femtocell 12, the communications device may register with the femtocell 12, provided, that the device is part of the subscriber profile for that femtocell 12. In an example embodiment, the femtocell 12 obtains information about the communications device, such as the communications device's MSISDN (Mobile Subscriber Integrated Services Digital Network Number), as shown in column 32 of the table 28. The femtocell 12 can use a device's MSISDN as an identifier, or can assign an identifier to a device, such as shown in column 30 of the table 28. Also as depicted in the table 28 in column 34, the femtocell 12 maintains an indication as to whether a device is within its area of coverage. Thus, as a device exits the area of coverage 36 of the femtocell 12, this is recorded in the table 28 in column 34. The femtocell 12 can maintain information about a device after it exits its area of coverage or the femtocell 12 can delete all information about a device after is exits its area of coverage.

When the femtocell is first deployed and provisioned, certain information about the femtocell is determined and recorded by the wireless service provider. Such information may include, for example, latitude/longitude positioning information for that femtocell, the cell identification scrambling code, the Routing Area Code ("RAC"), Location Area Code ("LAC"), and the radio network controller ("RNC"). As will be appreciated by those skilled in the art, this information is presently stored in the normal course of operations for all deployed and provisioned femtocells.

Communications devices may also be located within the femtocell in any appropriate manner. For example, communications devices can be located via GPS (Global Positioning System), A-GPS (Assisted Global Positioning System), time difference of arrival calculations, time of arrival calculations, angle of arrival calculations, via user entered information, or any combination thereof. If a communications device is configured with a GPS receiver, the communications device can provide information to the femtocell 12 pertaining to its location as determined by the GPS. The femtocell 12 can receive information pertaining to the location of a device via A-GPS. In an example embodiment, a user can walk through his/her house and provide location information or specific spots (e.g., waypoints) to the femtocell 12. For example, the user can stand at the center of the living room and provide location information to the femtocell, such as an X/Y coordinate, a lat/long value, or the like. The femtocell could prompt the user to provide information as to the name of the room and use this name in locating device. For example, the user could stand in the middle of the living room and send a signal (e.g., via a mobile communications device) to the femtocell indicating that the user want to register a waypoint (name a location). The femtocell, upon receiving signal and noting the location, can send a prompt to the user asking for the name of the location, e.g., living room. Subsequently, when the femtocell 12 detects a device in proximity to the registered waypoint, the femtocell determines that the device is in the living room.

In an example embodiment, the femtocell 12 can determine the location of a communications device via various calculation techniques. For example, the femtocell 12 can send a signal to all communications device within its area of coverage, and measure the time of response from each communications device. This information can be used to locate a device via time difference of arrival calculations and/or time of arrival calculations. If the femtocell has directional capability and can measure the angle of arrival of a response from each communications device, the femtocell 12 can determine the location of each communications device via angle of arrival calculations. Locations of designated areas can be provided to the femtocell 12 in any appropriate manner. For example, a user could enter coordinates of designated areas (e.g., perimeter of office 36, etc.), a designated area could be registered with the femtocell 12 by the user walking the perimeter of an area with a transponder, communications device, or the like, that provide location information to the femtocell 12.

Thus, not only will the network know the location of the femtocell 12 based on its provisioning, it is also possible that the femtocell 12 could know with even greater specificity where the devices that are in communication with the femtocell 12 are located.

Figure 2:
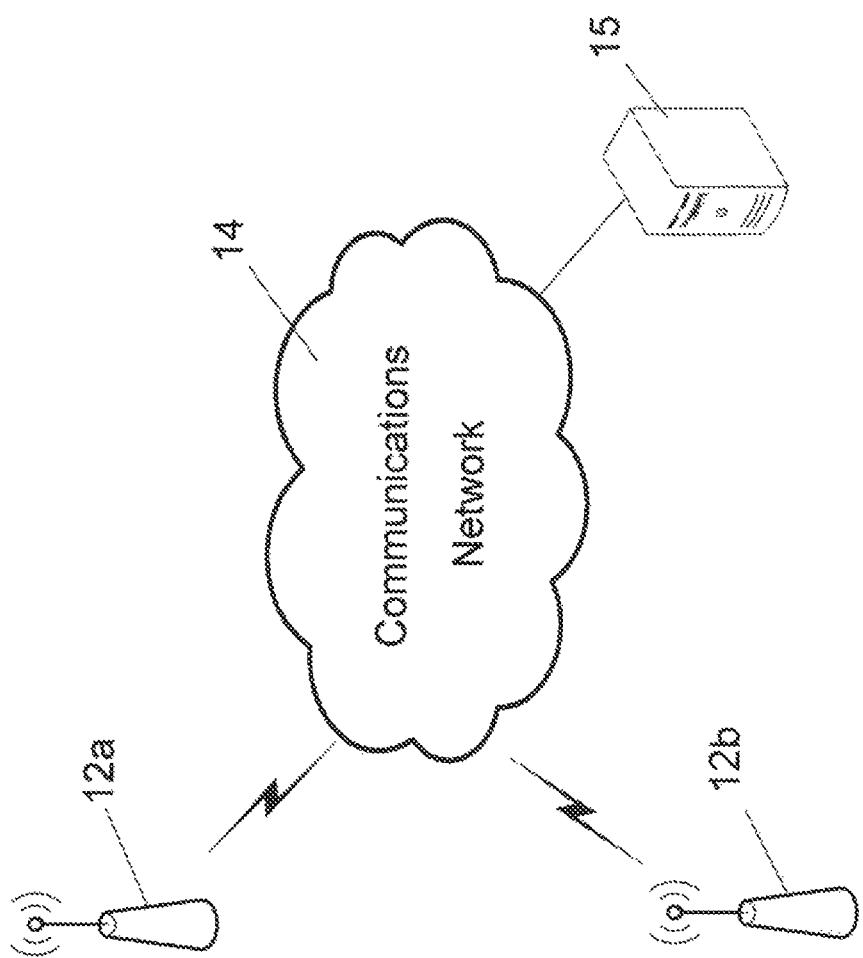
FIG. 2 is an illustration of an example communications network showing multiple femtocells and a location server as part of the network.

With reference to FIG. 2, there is shown the communications network 14 with a plurality of femtocells 12a and 12b in communication therewith. Also shown is a location server 15 which operates to provide and update location information for subscribers of the communications network 14.

With further reference to FIG. 1, for exemplary purposes, assume mobile device 24 is making a call. When a caller on a mobile device 24 places a call through femtocell 12, the network will know the approximate location of the mobile device 24 because it knows the registered location of the femtocell 12. This is especially useful for calls in the E-911 scenario, because the network will know both the subscriber information and the location of the femtocell.

Figure 3:
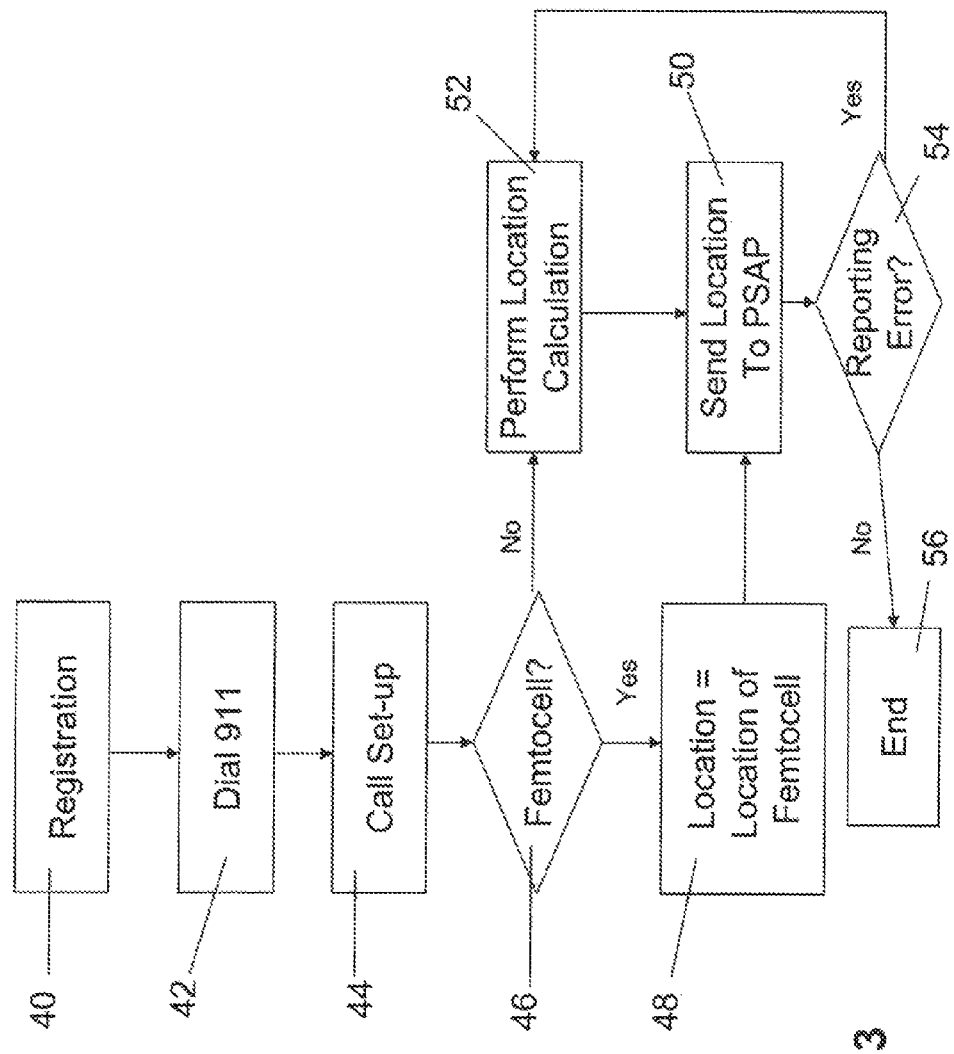
FIG. 3 is a flow diagram of an example process for determining a location to be passed to a Public Safety Access Point.

With reference to FIG. 3, there is shown a flow diagram of an exemplary call to 911. At step 40, the mobile device 24 registers with the femtocell 12. The registration message is a standard registration message between a mobile device 24 assigned to the femtocell 12 as known by those skilled in the art. At step 42, the caller dials 911 on the mobile device 24. At step 44, the call is set up by the network through the femtocell 12. At step 46, the determination is made by the network whether the call is being made by a mobile device 24 through a femtocell 12. If the call is through a femtocell 12, the recorded location of the femtocell 12 is considered the location of the mobile device 24 at step 48. At step 50, that location is passed to the PSAP. If the call is not placed through the femtocell 12, i.e., the mobile device 24 is outside the range of the femtocell 12 or otherwise not registered or not in communication with the femtocell 12, then the location of the mobile device 24 is determined by an alternative method at step 52 and that determined location is reported to the PSAP at step 50. At step 54, if there is an error in reporting to the PSAP, then the alternative method determination at step 52 is performed, or re-performed. If there is no error in reporting to the PSAP, then the process ends at step 56.

Figure 4:
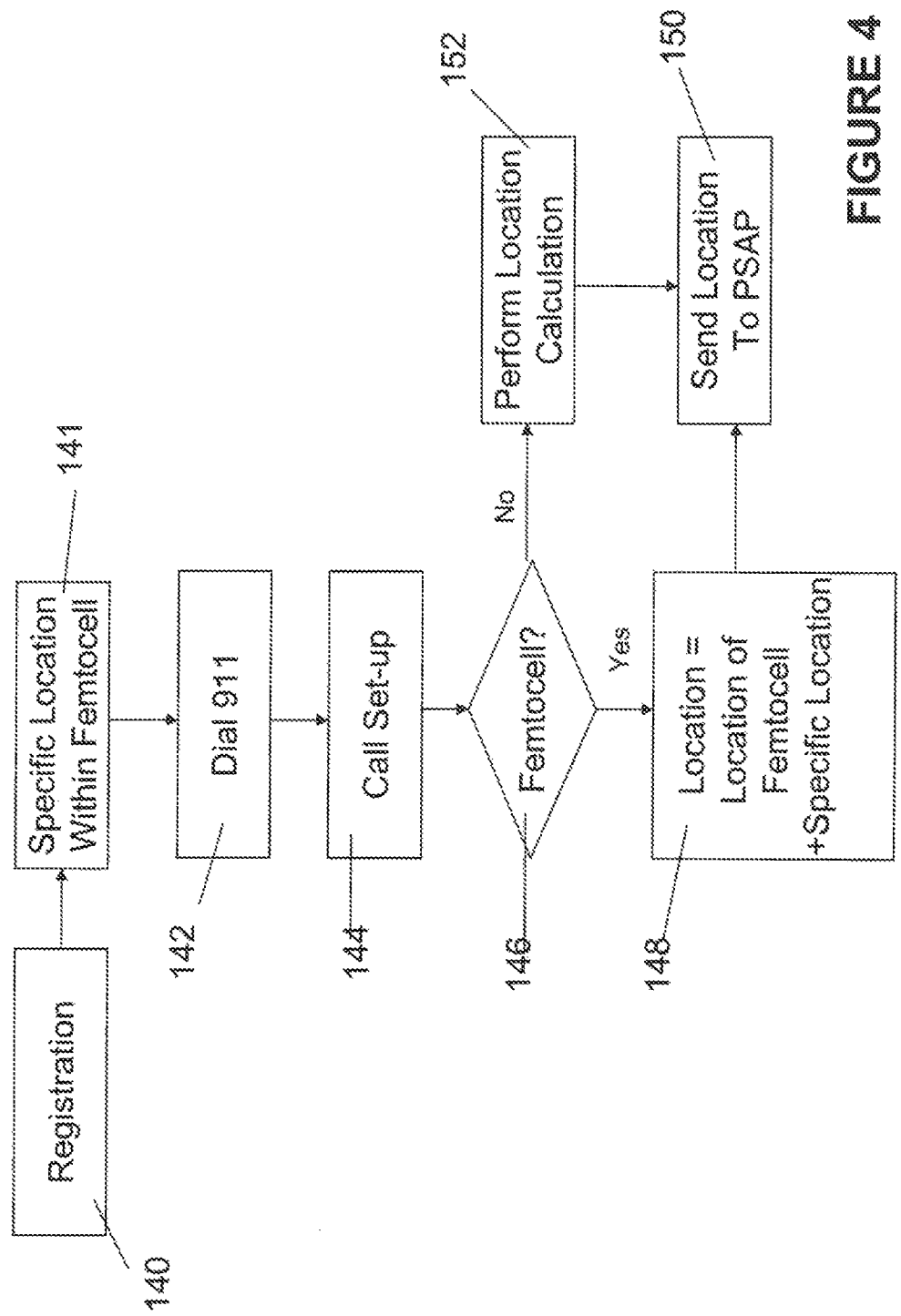
FIG. 4 is a flow diagram of an example process for determing a more specific location within a femtocell to be passed to a Public Safety Access Point.

As an alternative embodiment, it is possible that the femtocell 12 may more specific location information about the mobile device 24, for example, it may know that the mobile device 24 is located in the living room waypoint. Thus, the femtocell 12 could report that more specific location during a 911 call, meaning that the location message that is passed to the PSAP includes both an address and a more specific location, i.e., the living room, at that address. With reference to FIG. 4, there is shown a flow diagram of an exemplary alternative call to 911. At step 140, the mobile device 24 registers with the femtocell 12. The registration message is a standard registration message between a mobile device 24 assigned to the femtocell 12 as known by those skilled in the art. At step 141, the femtocell determines a more specific location of the mobile device 24 within the coverage area of the femtocell 12. At step 142, the caller dials 911 on the mobile device 24. At step 144, the call is set up by the network through the femtocell 12. At step 146, the determination is made by the network whether the call is being made by a mobile device 24 through a femtocell 12. If the call is through a femtocell 12, the recorded location of the femtocell 12 is considered the address location of the mobile device 24, and the more specific location within the femtocell 12 coverage area is determined at step 148. At step 150, that address location and more specific location is passed to the PSAP. If the call is not placed through the femtocell 12, i.e., the mobile device 24 is outside the range of the femtocell 12 or otherwise not registered or not in communication with the femtocell 12, then the location of the mobile device 24 is determined by an alternative method at step 152 and that determined location is reported to the PSAP at step 150. Also possible but not shown in FIG. 4 is the situation demonstrated in FIG. 4 in which the location of the mobile device 24 may be determined by alternative means if there is an error detected in reporting the location.

Figure 5:
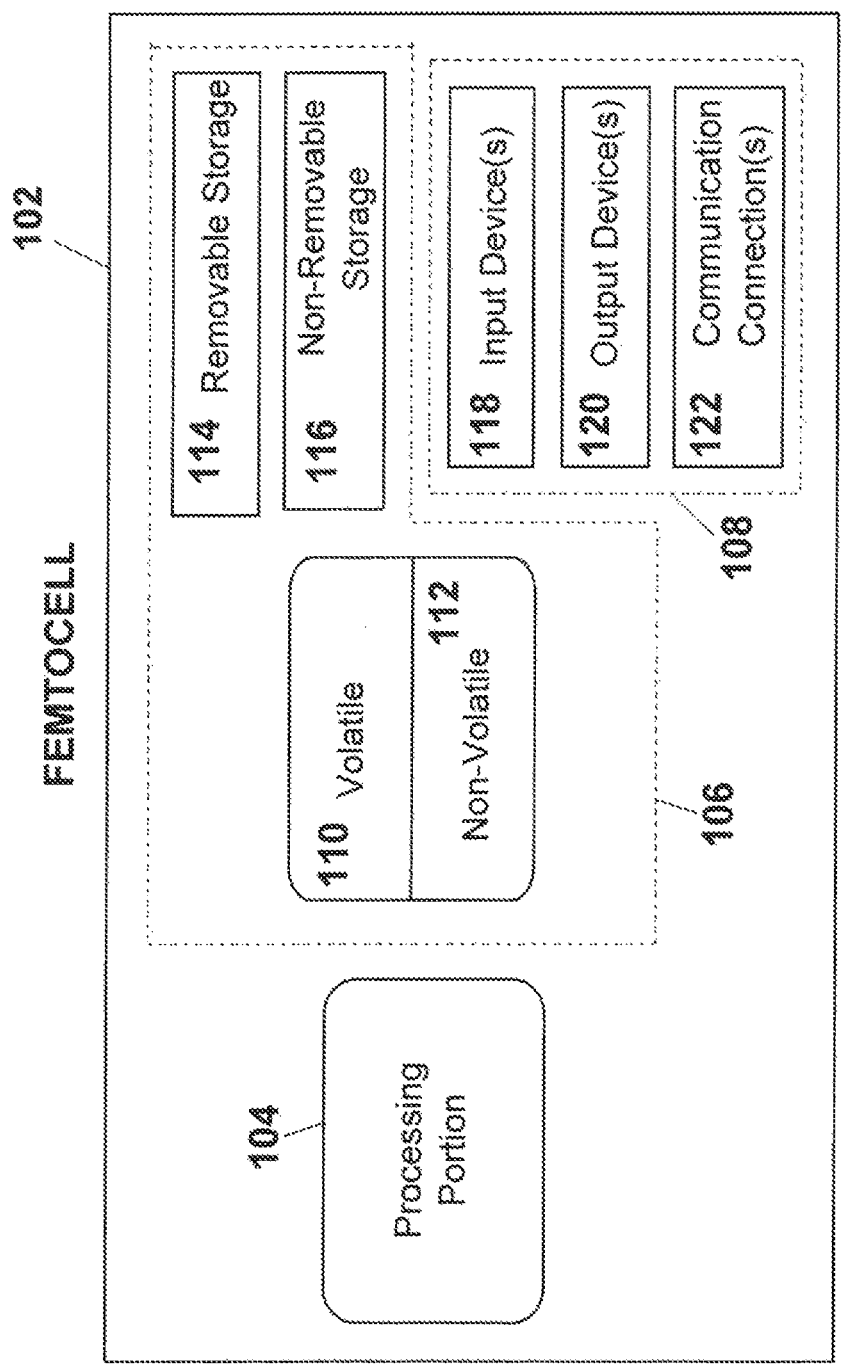
FIG. 5 is a functional block diagram of an example femtocell.

It should be noted that the exemplary embodiment relates to E-911 calls, but the present disclosure is not limited thereby. This location methodology may be employed to deliver any location-based services FIG. 5 is a functional block diagram of an example femtocell 102. It is emphasized that the block diagram depicted in FIG. 5 is exemplary and not intended to imply a specific implementation or configuration. Accordingly, the femtocell 102 can be implemented in a single processor or multiple processors. Multiple processors can be distributed or centrally located. Multiple processors can communicate wirelessly, via hard wire, or a combination thereof.

In an example configuration, the femtocell 102 comprises a processing portion 104, a memory portion 106, and an input/output portion 108. The processing portion 104, memory portion 106, and input/output portion 108 are coupled together (coupling not shown in FIG. 5) to allow communications therebetween. The input/output portion 108 is capable of receiving and/or providing information from/to a communications device. For example, the input/output portion 106 is capable of managing calls to and from all communications devices within an area of coverage of the femtocell. In various configurations, the input/output portion 108 can receive and/or provide information via any appropriate means, such as, for example, optical means (e.g., infrared), electromagnetic means (e.g., GSM, CDMA, RF, WI-FI, BLUETOOTH, ZIGBEE, etc.), acoustic means (e.g., speaker, microphone, ultrasonic receiver, ultrasonic transmitter), or a combination thereof. In various configurations, the input/output portion 108 can receive and/or provide information wirelessly, via a wired connection, or a combination thereof.

The processing portion 104 is capable of performing functions associated with communicating with communications devices within an area of coverage of the femtocell 102. For example, as described above, the processing portion 104 is capable of detecting a communications device, registering a communications device, adding information stored in the femtocell, removing information stored in the femtocell, updating information stored in the femtocell, determining if a communications device has exited the femtocell's area of coverage, unregistering a communications device, determining the most recently location of a communications device, transferring a call, sending a call to voice mail, assigning an identifier to a communications device, or any combination thereof.

The memory portion 106 can store any information utilized in conjunction with communicating with communications devices within an area of coverage of the femtocell 102. For example, as described above, the memory portion 106 is capable of storing an identifier of a communications device (e.g., MSISDN), information pertaining to whether a communications device is within the area of coverage or not within the area of coverage of the femtocell 102, the location of a communications device, or a combination thereof. Depending upon the exact configuration and type of femtocell, the memory portion 106 can include computer readable storage media that is volatile 110 (such as dynamic RAM), non-volatile 112 (such as ROM), or a combination thereof. The femtocell 102 can include additional storage, in the form of computer readable storage media (e.g., removable storage 114 and/or non-removable storage 116) including, but not limited to, RAM, ROM, EEPROM, tape, flash memory, smart cards, CD-ROM, digital versatile disks (DVD) or other optical storage, magnetic cassettes, magnetic tape, magnetic disk storage or other magnetic storage devices, universal serial bus (USB) compatible memory, or any other medium which can be used to store information and which can be accessed by the femtocell 102.

The femtocell 102 also can contain communications connection(s) 122 that allow the femtocell 102 to communicate with other devices, femtocells, or the like. A communications connection(s) can comprise communication media. Computer readable communication media typically embody computer readable instructions, data structures, program modules or other data, that can be transported via a modulated data signal such as a carrier wave or other transport mechanism and includes any information delivery media. By way of example, and not limitation, communication media include wired media such as a wired network or direct-wired connection, and wireless media such as acoustic, RF, infrared, and other wireless media. The term computer readable media as used herein includes both storage media and communication media. The femtocell 102 also can include input device(s) 118 such as keyboard, mouse, pen, voice input device, touch input device, etc. Output device(s) 120 such as a display, speakers, printer, etc. also can be included.

While example embodiments of femtocell location determination have been described in connection with various computing devices/processor, the underlying concepts can be applied to any computing device, processor, or system capable of utilizing and/or implementing femtocell location determination. The various techniques described herein can be implemented in connection with hardware or software or, where appropriate, with a combination of both. Thus, the methods and apparatuses for the utilization of femtocell call management, or certain aspects or portions thereof, can take the form of program code (i.e., instructions) embodied in tangible storage media, such as floppy diskettes, CD-ROMs, hard drives, or any other machine-readable storage medium, wherein, when the program code is loaded into and executed by a machine, such as a computer, the machine becomes an apparatus for the utilization of femtocell calling location determination. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

The methods and apparatuses for femtocell call location determination also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for the utilization of femtocell call management. When implemented on a general-purpose processor, the program code combines with the processor to provide a unique apparatus that operates to invoke the functionality of femtocell call management. Additionally, any storage techniques used in connection with the utilization of femtocell call management can invariably be a combination of hardware and software.

While femtocell call location has been described in connection with the various embodiments of the various figures, it is to be understood that other similar embodiments can be used or modifications and additions can be made to the described embodiment for performing the same function of femtocell call management without deviating therefrom. For example, one skilled in the art will recognize that femtocell call location as described in the present application may apply to any environment, whether wired or wireless, and may be applied to any number of such devices connected via a communications network and interacting across the network. Therefore, femtocell call location should not be limited to any single embodiment, but rather should be construed in breadth and scope in accordance with the appended claims.

What is claimed is:

1. A method, comprising:
   determining, by a system comprising a processor, location information for a mobile device as a function of a registered location of a femtocell device;
   receiving, by the system, additional location information for the mobile device from the femtocell device, wherein the additional location information comprises a result of a time difference of arrival calculation based on a signal directed by the femtocell device to a plurality of mobile devices within a coverage area of the femtocell device; and
   reporting, by the system, a location of the mobile device as a function of combining the location information with the additional location information.

2. The method of claim 1, further comprising reporting, by the system, a designated waypoint within the coverage area of the femtocell device as the location of the mobile device, and as a function of the combining of the location information with the additional location information.

3. The method of claim 1, wherein the location information comprises at least one of global positioning system data, assisted global positioning system data, angle of arrival data or input data received by the system.

4. The method of claim 1, wherein the reporting the location comprises reporting the location of the mobile device to a public safety access point device.

5. The method of claim 1, further comprising:
   requesting the mobile device to communicate a name of the location.

6. A femtocell device, comprising:
   a memory to store computer-executable instructions; and
   a processor, coupled to the memory, that facilitates execution of the computer-executable instructions to perform operations, comprising:
      registering a location of the femtocell device within a wireless service provider network to determine location information of a mobile device;
      determining additional location information associated with the mobile device, wherein the additional location information associated with the mobile device is determined based on a time difference of arrival calculation that is a function of a signal directed by the femtocell device to a set of mobile devices; and
      reporting the location of the mobile device as a function of combining the location information and the additional location information.

7. The femtocell device of claim 6, wherein the operations further comprise providing the location of the femtocell device and the location information associated with the mobile device to a network device of the wireless service provider network.

8. The femtocell device of claim 6, wherein the operations further comprise, in response to a signal, associating an identifier with a designated area within a coverage area of the femtocell device.

9. The femtocell device of claim 8, wherein the operations further comprise, in response to a signal, registering location coordinates for the designated area.

10. The femtocell device of claim 8, wherein the identifier comprises a mobile subscriber integrated services digital network number.

11. The femtocell device of claim 9, wherein the operations further comprise detecting the mobile device in proximity to the registered location coordinates for the designated area.

12. A non-transitory computer-readable storage medium storing computer-executable instructions that, in response to execution, cause a system comprising a processor to perform operations, comprising:
- determining information associated with a location of a mobile device ascertained to be within a coverage area of a femtocell device;
- ascertaining additional information associated with the location of the mobile device as a function of time difference of arrival data based on a signal sent by the femtocell device to the mobile device situated within a defined broadcast area of the femtocell device; and
- reporting the location of the mobile device as location information that is a function of combining the information and the additional information.

13. The non-transitory computer-readable storage medium of claim 12, wherein the determining the information associated with the location of the mobile device comprises detecting entry of the mobile device into the coverage area of the femtocell device.

14. The non-transitory computer-readable storage medium of claim 12, wherein the determining the information associated with the location of the mobile device comprises obtaining directional information associated with a response from the mobile device to a signal sent by the femtocell device.

15. The non-transitory computer-readable storage medium of claim 12, wherein the determining the information associated with the location of the mobile device comprises sending a signal to the mobile device, and measuring a time for response to the signal from the mobile device.

16. The non-transitory computer-readable storage medium of claim 12, wherein the determining the information associated with the location of the mobile device comprises measuring an angle of arrival of a response from the mobile device.

17. The non-transitory computer-readable storage medium of claim 12, wherein the operations further comprise:
- prompting the mobile device to communicate the location information to the femtocell device, the location information comprising a coordinate.

18. The non-transitory computer-readable storage medium of claim 12, wherein the operations further comprise:
- prompting the mobile device to provide a name for the location information; and
- in response to detecting the mobile device in proximity to a registered waypoint, utilizing the name in determining the location of the mobile device.

19. The non-transitory computer-readable storage medium of claim 12, wherein the operations further comprise:
- receiving a signal from the mobile device, the signal indicating a request to register a waypoint with a name of the location.

20. The non-transitory computer-readable storage medium of claim 12, wherein the operations further comprise:
- providing the location information associated with the femtocell device to a wireless service provider device.

* * * * *